May 4, 1954  L. K. RUDD ET AL  2,677,791
DISPENSING MACHINE SYSTEM
Filed April 22, 1949
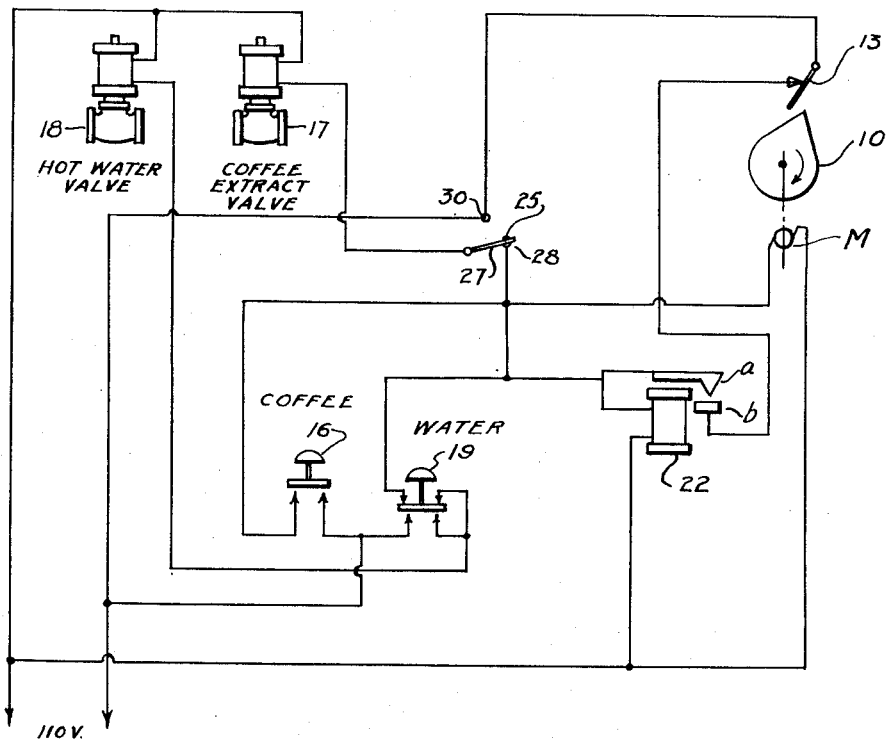
Inventors
Lloyd K. Rudd and
Khoren C. Melikian
By
Albert M. Zalkind
ATTORNEY Patented May 4, 1954

2,677,791

UNITED STATES PATENT OFFICE 2,677,791

DISPENSING MACHINE SYSTEM

Lloyd K. Rudd and Khoren C. Melikian, Philadelphia, Pa., assignors to Rudd-Melikian Corporation, a corporation of Pennsylvania Application April 22, 1949, Serial No. 89,048

2 Claims. (Cl. 317—137)

This invention relates to dispensing machines, and more particularly to a machine for dispensing coffee for use in restaurants, cafeterias, etc.

In the restaurant trade a problem has existed for many years in connection with maintenance of an adequate supply of hot fresh coffee to meet all normal demands. A large number of coffee making and dispensing devices have been patented, most of which are gas heated coffee brewers comprising large urns or tanks as reservoirs for the brewed coffee. These devices require considerable space which is usually at a premium in restaurants and grills, and, further, coffee stored for hours in the urns quickly deteriorates while awaiting sale, accounting for the frequently poor quality of coffee dispensed by conventional devices.

Our invention substantially eliminates these drawbacks by providing a compact dispensing device which, in effect, brews each cup of coffee fresh, thus eliminating the necessity of storing a large quantity of brewed coffee.

We have found that coffee essence as extracted from the bean has keeping qualities which are roughly inversely proportional to the amount of water in which the essence is dissolved, up to a certain point. In other words, the stronger the coffee, the better the keeping quality. Accordingly, we provide a device which stores a relatively small quantity of liquid coffee concentrate commensurate with normal demand, and which device has an electrically heated water tank for heating and storing water. Since the water is electrically, and therefore rapidly, heated and since no space is taken up with brewing elements such as cloth bags, etc., we are enabled to construct a machine which is more compact and at the same time more effective than conventional devices. Since the liquid coffee extract utilized by us has excellent keeping qualities and since it is not mixed with the water except on a cup unit basis during the dispensing cycle, our device serves uniformly wholesome and fresh coffee.

In the light of the above discussion, an object of our invention is to provide a dispensing machine for automatically controlling predetermined quantities of hot water and liquid coffee extract so as to obtain a cupful of said ingredients mixed in proper proportion during the dispensing cycle.

Another object of our invention is to devise our machine so that continuous flow of either hot water or liquid coffee extract may be effected if desired.

Other objects and features will be apparent from the detailed description which now follows, taken in conjunction with the appended drawing which illustrates the electrical circuit and the essential elements of our combination.

With reference to the drawing, our device comprises a timing arrangement for opening and closing solenoid type valves for hot water and coffee, as shown. The mode of supply of these ingredients may be along conventional lines. Our timing arrangement utilizes a timing cam 10, motor operated at a fixed speed depending on the flow characteristics of the particular valves used. Cam 10 is capable, by clockwise rotation of momentarily opening the normally closed switch 13. Thus the period of the dispensing cycle is determined, when the motor is energized in a manner to be described, angular momentum of the motor being relied on to carry the cam past the switch after momentary opening thereof, so that the switch may close and the machine be readied for the next cycle.

Motor M is energized in response to pressing a "Coffee" push button 16 which is normally open. Current then flows through the upper terminals of a "Water" push button 19 which is normally closed in the position shown, to the delivery relay 22 and also to the motor M. The motor, thus energized, commences to rotate in a clockwise direction as indicated by the arrow, while energization of relay 22 closes contacts $a$ and $b$, which sends current through switch 13 to the coffee extract valve 17, it being understood that push button 16 is only momentarily pressed. Thus maintenance of current to the coffee extract valve is maintained by the locking-in feature of relay 22, as provided by engagement of contacts $a$ and $b$ to maintain energization of the solenoid through switch 13. Simultaneous with opening of the coffee extract valve, the hot water valve 18 is also energized upon closing of contacts $a$ and $b$, current flowing through the normally closed upper contacts of switch 19, thence through contacts $a$ and $b$ and thence through switch 13 to the other side of the power line, as shown.

It will be appreciated that the solenoid switch 22, having one lead connected permanently to one side of the line and the other lead connected through switch 13 to the other side of the line, energization thereof will continue only so long as switch 13 is closed. This is the dispensing cycle, during the course of which hot water and coffee extract will be presumed to flow through the valves into a drinking cup (not shown). The dispensing cycle ends when cam 10 trips switch 13 thereby de-energizing the solenoid of relay 22, whence contact is broken between elements *a* and *b*. At this time no further energizing current can reach either the hot water or the coffee extract valves, although, as previously mentioned, switch 13 subsequently closes as cam 10 passes the tripping point due to angular momentum of motor M. The machine is then in readiness for another dispensing cycle which can be again brought about by momentary pressing of switch 16.

Should it be desired to obtain a continuous flow of hot water, push button 19 is pressed down to make contact across its lower terminals, whence it will be seen that the hot water valve solenoid is continuously energized so long as push button 19 is held down. Further, should it be desirable, for any reason, to obtain a continuous flow of coffee extract alone, a single pole double throw switch 25 is provided. Although normally maintaining contact between the arm 27 and terminal 28 for normal operation of the machine, this switch may be shifted by moving arm 27 into engagement with terminal 30; whereby a continual energization of the solenoid of the coffee extract valve is had, whence continuous flow of coffee extract is effected so long as switch 25 is in the position described.

From the foregoing description it will be apparent that we have provided a machine having a minimum number of elements and a substantially simple circuit for performing a number of functions. It is believed that our invention may be varied or modified by persons skilled in the art without departing from the spirit thereof, e. g., a time delay mechanism could be used in place of our motor and cam arrangement, and, accordingly, we do not seek to be restricted to the specific disclosure except as set forth in the following claims.

We claim:

1. A coffee vending machine control system comprising a solenoid for operating a hot water valve, a solenoid for operating a coffee extract valve, a solenoid operated switch having a pair of normally open contacts engageable upon energization of the solenoid thereof, a timer switch having a pair of normally closed contacts and means including an electric motor for tripping engagement therebetween after a predetermined interval of energization of said motor, a coffee control push button having a pair of normally open contacts one of which is connected to a terminal of the motor and a hot water control push button having a pair of normally closed contacts and a pair of normally open contacts, the hot water and coffee valve solenoids having terminals connected to one side of a power line, a connection from the other side of said power line to one contact of said timer switch and to the other of the normally open contacts of said coffee control push button and to one of the normally opened contacts of the hot water control push button, a connection from the other terminal of said hot water solenoid to the other open contact of said hot water push button and to one of the closed contacts thereof, a connection from the other terminal of the coffee valve solenoid to the other contact of the coffee push button and to the other closed contact of the hot water push button and to one of the normally open contacts of the solenoid operated switch and to one terminal of the solenoid of said solenoid operated switch, the other terminal of the solenoid of said solenoid operated switch being connected to the same side of the power line as said terminals of the valve solenoids, the other contact of the solenoid operated switch being connected to the other contact of the timer switch, the other terminal of the electric motor being connected to the same side of the line as all solenoid terminals, whereby when said hot water push button is depressed a continuous energization of said hot water solenoid is effected for as long as said button is depressed, and whereby when said coffee push button is depressed, both the hot water and coffee extract solenoids are energized for a period depending on the period of energization of said motor.

2. A system as set forth in claim 1, including switch means for connecting said other terminal of the coffee solenoid to said one contact of said timer switch, while disconnecting said other terminal of the coffee solenoid from the other closed contact of said water push button and said one contact of said solenoid operated switch, whereby continual energization of the coffee extract solenoid is effected.

References Cited in the file of this patent

UNITED STATES PATENTS

| Number | Name | Date |
|---|---|---|
| 775,018 | Waterman | Nov. 15, 1904 |
| 775,021 | Waterman | Nov. 15, 1904 |
| 1,284,197 | Larner et al. | Nov. 5, 1918 |
| 1,773,130 | Denniston | Aug. 19, 1930 |
| 1,869,791 | Wright | Aug. 2, 1932 |
| 2,081,650 | Taminga | May 25, 1937 |
| 2,133,170 | Johnson | Oct. 11, 1938 |
| 2,319,075 | McKinnis | May 11, 1943 |
| 2,529,127 | Beach | Nov. 7, 1950 |